(12) United States Patent
Rossetti

(10) Patent No.: US 10,363,802 B2
(45) Date of Patent: Jul. 30, 2019

(54) MOTOR VEHICLE

(71) Applicant: Audi AG, 85045 Ingolstadt (DE)

(72) Inventor: Mario Rossetti, Neudenau (DE)

(73) Assignee: AUDI AG, Ingolstadt (DE)

( * ) Notice: Subject to any disclaimer, the term of this patent is extended or adjusted under 35 U.S.C. 154(b) by 79 days.

(21) Appl. No.: 15/531,284

(22) PCT Filed: Nov. 19, 2015

(86) PCT No.: PCT/EP2015/002324
§ 371 (c)(1),
(2) Date: May 26, 2017

(87) PCT Pub. No.: WO2016/082923
PCT Pub. Date: Jun. 2, 2016

(65) Prior Publication Data
US 2018/0037099 A1     Feb. 8, 2018

(30) Foreign Application Priority Data

Nov. 27, 2014    (DE) .................. 10 2014 017 518

(51) Int. Cl.
*B60J 7/14*         (2006.01)
*B60J 7/20*         (2006.01)
*B60J 7/16*         (2006.01)
(52) U.S. Cl.
CPC ............... B60J 7/146 (2013.01); *B60J 7/201*
(2013.01); *B60J 7/1692* (2013.01)
(58) Field of Classification Search
CPC ........... B60J 7/146; B60J 7/201; B60J 7/1692
See application file for complete search history.

(56) References Cited

U.S. PATENT DOCUMENTS

2003/0080580 A1    5/2003   Obendiek
2006/0131922 A1    6/2006   Russke

FOREIGN PATENT DOCUMENTS

| CN | 102333663 | 1/1988 |
| DE | 42 03 229 | 8/1993 |
| DE | 102005002935 | 7/2006 |
| DE | 102007004180 | 8/2010 |
| FR | 2 601 906 | 1/1988 |

(Continued)

OTHER PUBLICATIONS

International Search Report issued by the European Patent Office in International Application PCT/EP2015/002324 dated Feb. 12, 2016.

(Continued)

*Primary Examiner* — D Glenn Dayoan
*Assistant Examiner* — Melissa A Black
(74) *Attorney, Agent, or Firm* — Henry M. Feiereisen LLC

(57) ABSTRACT

A motor vehicle includes a body, a roof which is adjustable between a closed position and an opened position and has at least one front roof part and a rear roof part, two opposite side pillars, and two opposite rear pillars. The front roof part is connected rotatably to the two side pillars and the rear roof part is connected rotatably to the two rear pillars. The two side pillars and the two rear pillars are movably connected to the body. In the opened position of the roof, the rear roof part forms a folding top compartment lid, below which the front roof part, the two side pillars, and the two rear pillars are stowed.

10 Claims, 3 Drawing Sheets

(56) References Cited

FOREIGN PATENT DOCUMENTS

GB   2 420 530    5/2006
JP   2005-53379   3/2005

OTHER PUBLICATIONS

Chinese Search Report dated Nov. 27, 2018 by the Chinese Patent Office in Chinese Patent Application No. 2015800613268.
English translation of Chinese Search Report dated Nov. 27, 2018 by the Chinese Patent Office in Chinese Patent Application No. 2015800613268.

MOTOR VEHICLE

CROSS-REFERENCES TO RELATED APPLICATIONS

This application is the U.S. National Stage of International Application No. PCT/EP2015/002324, filed Nov. 19, 2015, which designated the United States and has been published as International Publication No. WO 20161082923 and which claims the priority of German Patent Application, Serial No. 10 2014 017 518.9, filed Nov. 27, 2014, pursuant to 35 U.S.C. 119(a)-(d).

BACKGROUND OF THE INVENTION

The invention relates to a motor vehicle having a body with a roof which can be adjusted between a closed position and an opened position.

DE 10 2005 002 935 A1 discloses a generic motor vehicle. Since the side pillars, there referred to as C-pillars, cannot be lowered, this vehicle cannot provide the feel of a genuine convertible.

In the general state of the art, most diverse convertible vehicles are also known, which, however, normally have a very restricted transport capacity.

SUMMARY OF THE INVENTION

It is therefore an object of the present invention to provide a motor vehicle which has a roof that can be adjusted between a closed position and an opened position and which on one hand exhibits a great transport capability in the closed position of the roof, and on the other hand conveys a genuine feel of a cabriolet in the opened position of the roof.

According to the invention, this object is achieved by a motor vehicle which includes a body, a roof which is adjustable between a closed position and an opened position and has at least one front roof part and a rear roof part, two opposite side pillars, and two opposite rear pillars, wherein the front roof part is connected rotatably to the two side pillars, wherein the rear roof part is connected rotatably to the two rear pillars, wherein the two side pillars and the two rear pillars are movably connected to the body, wherein in the opened position of the roof, the rear roof part forms a folding top compartment lid, below which the front roof part, the two side pillars, and the two rear pillars are stowed.

By virtue of the fact that the front roof part is rotatably connected to the two side pillars and the rear roof part is rotatably connected to the two rear pillars, both roof parts can also be pivoted into the body like the respective pillars themselves, when the side and rear pillars that are connected movably to the body are correspondingly moved. As a result, it is possible to bring the roof of the motor vehicle according to the invention in its opened position to such a position as to establish a feel that is comparable with "typical" convertibles. Still, due to the presence of the side pillars and the rear pillars in the closed state of the roof, a motor vehicle is provided which has a far greater transport capacity than known convertible vehicles.

A saving of components, combined with a weight reduction and simplification of the actuation of the roof of the motor vehicle according to the invention, is realized by the fact that the rear roof part forms a folding top compartment lid which is used to produce a flawless outer look of the motor vehicle by covering the front roof part, the two side pillars and the two rear pillars.

In order to achieve a simple and reliable mobility of the side pillars, provision is made in accordance with a very advantageous refinement of the invention for a rotatable attachment of the two side pillars to the body at respective centers of rotation.

Furthermore, provision can be made for a rotatable support of the two rear pillars in relation to the body and their shiftability in respective guides in relation to the body. As a result of this combination of a rotatable support and a shiftability of the two rear pillars, the latter can easily move into the body in the closed position of the roof, despite its virtually vertical position, in order to be ultimately covered by the rear roof part as a folding top compartment lid.

In order to increase stiffness of the roof according to the Invention in both its closed and opened positions, provision can further be made for the two side pillars to be connected to one another in the transverse direction of the body.

A simple protection of the passengers of the motor vehicle according to the invention is realized, when a windshield frame connected to respective A-pillars is arranged in such a position that it forms together with the folding top compartment lid in the opened position of the roof a rollover protection for persons present in the motor vehicle.

Furthermore, when provision is made for the rear roof part to rest in the closed position of the roof on the two side pillars, a particularly high stiffness of the roof and thus of the body is realized in the closed position.

BRIEF DESCRIPTION OF THE DRAWING

Further advantageous embodiments and refinements of the invention are set forth in the remaining subclaims. In the following, an exemplary embodiment of the invention is shown in principle with reference to the drawing.

It is shown in.

DETAILED DESCRIPTION OF PREFERRED EMBODIMENTS

Figure 1:
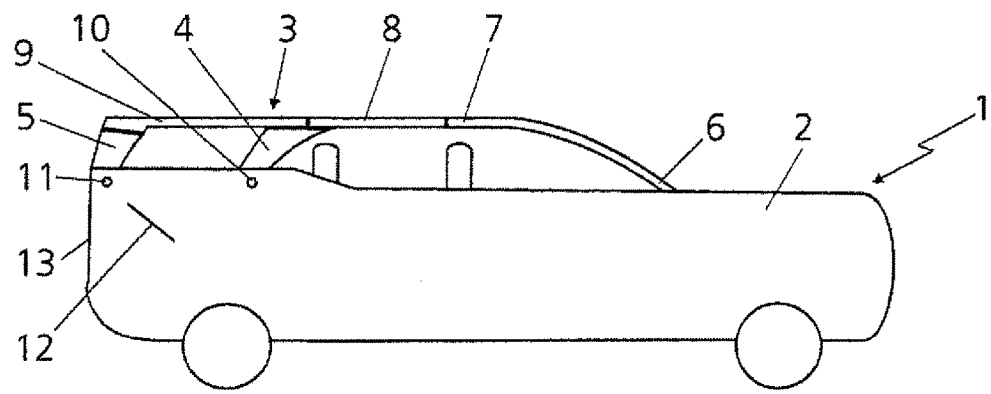
FIG. 1 a motor vehicle according to the invention with a roof in its closed position.
Figure 2:
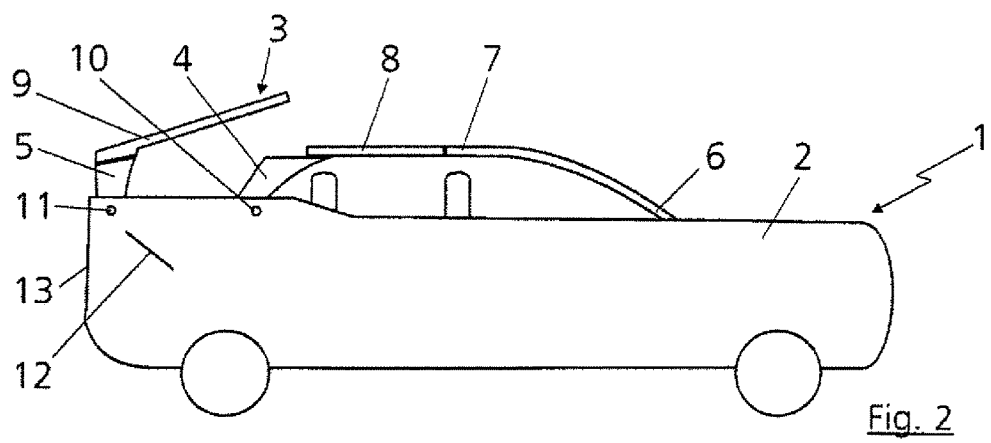
FIG. 2 the motor vehicle from FIG. 1 with the roof in a first intermediate position.

FIG. 1 shows a side view of a motor vehicle 1, which in a manner known per se has a body 2. The body 2 has a roof 3, which, as will be described hereinafter in detail, is adjustable between a closed position shown in FIG. 1 and an opened position shown in FIG. 8. Furthermore, the body 2 has two opposite side pillars 4, i.e. located on both sides of the body 2, and two opposite rear pillars 5, i.e. located on both sides of the body 2, of which only one is visible in the side views. The side pillars 4 and the rear pillars 5 form part of the body 2 in the closed state of the roof 3. In the front area, the body 2 has respective A-pillars 6, which have a rear region which faces the roof 3 and terminates in a windshield frame 7. Similar to the A-pillars 6, it would also be possible to designate the side pillars 4 and the rear pillars 5 by letters, for example as B, C or D pillars. This, however, has not been followed in order to avoid confusion with existing vehicles and due to the fact that the motor vehicle 1 in the illustrated exemplary embodiment does not have B pillars in the actual sense. The absence of the B-pillar further improves the feel as a convertible of the motor vehicle 1.

In the present case, the roof 3 has a front roof part 8 and a rear roof part 9. In principle, a further roof part could be located in front of the front roof part 8 or the front roof part 8 could basically be configured of two parts. For reasons of optics and for simplicity of the function of the roof 3, the roof 3, adjustable between the closed position according to FIG. 1 and the opened position according to FIG. 8, has only one front roof part 8. The front roof part 8 is rotatably connected to the two side pillars 4, whereas the rear roof part 9 is rotatably connected to the two rear pillars 5. Furthermore, the two side pillars 4 and the two rear pillars 5 are movably connected to the body 2. In the present case, the two side pillars 4 are rotatably mounted on the body 2 at respective centers of rotation 10. In a similar manner, the two rear pillars 5 are mounted at respective centers of rotation 11 for rotation in relation to the body 2. The respective centers of rotation 10 and 11 establish respective rotation axes for the side pillars 4 and the rear pillars 5, respectively. In addition, the two rear pillars 5 are displaceable in relation to the body 2 in respective guides 12, which are only indicated schematically, as are the centers of rotation 10 and 11. The side pillars 4 can accordingly execute a rotary movement, the rear pillars 5 a combined rotary and sliding movement with respect to the body 2.

Figure 6:
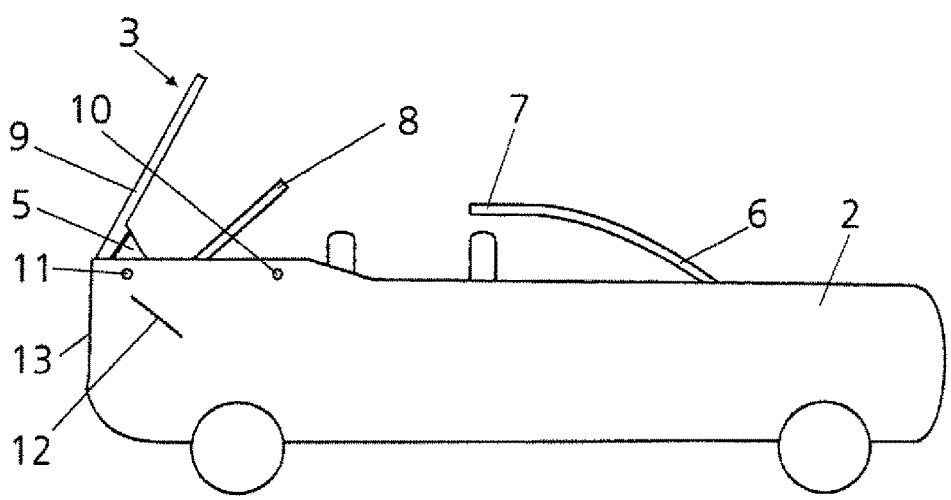
FIG. 6 the motor vehicle from FIG. 1 with the roof in a fifth intermediate position.
Figure 7:
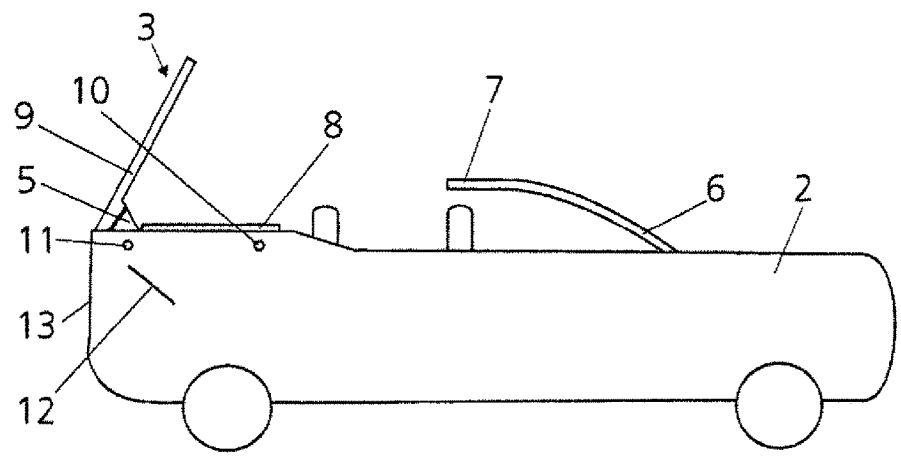
FIG. 7 the motor vehicle from FIG. 1 with the roof in a sixth intermediate position.
Figure 8:
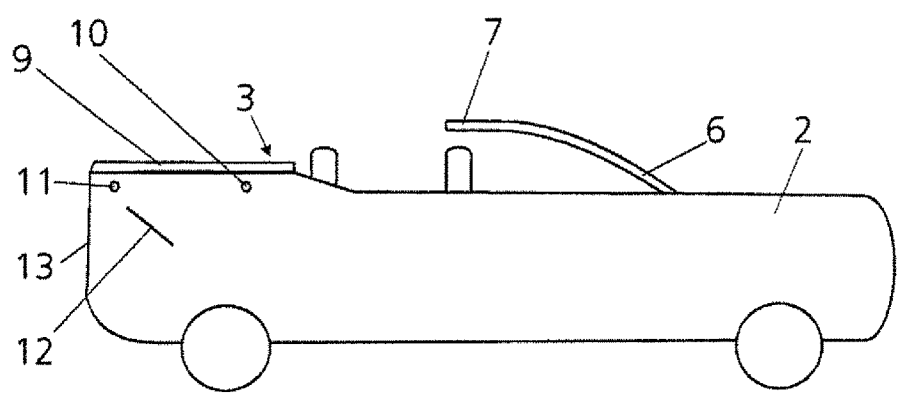
FIG. 8 the motor vehicle from FIG. 1 with the roof in its opened position.

FIGS. 2 to 7 illustrate different intermediate positions of the roof 3 during its movement between the closed position according to FIG. 1 and the opened position according to FIG. 8 in a very schematic and not-to-scale manner. In the position according to FIG. 2, the two rear pillars 9 have been rotated about the center of rotation 11, thereby causing the rear roof part 9 to be lifted off the side pillars 4. In addition to the rotation about the center of rotation 11, a certain displacement along the guides 12 may, optionally, also take place. The guides 12 can, for example, be configured in the form of rails; However the use of screw spindles, such as, for example, ball-screw shafts and the like, is also conceivable.

Figure 3:
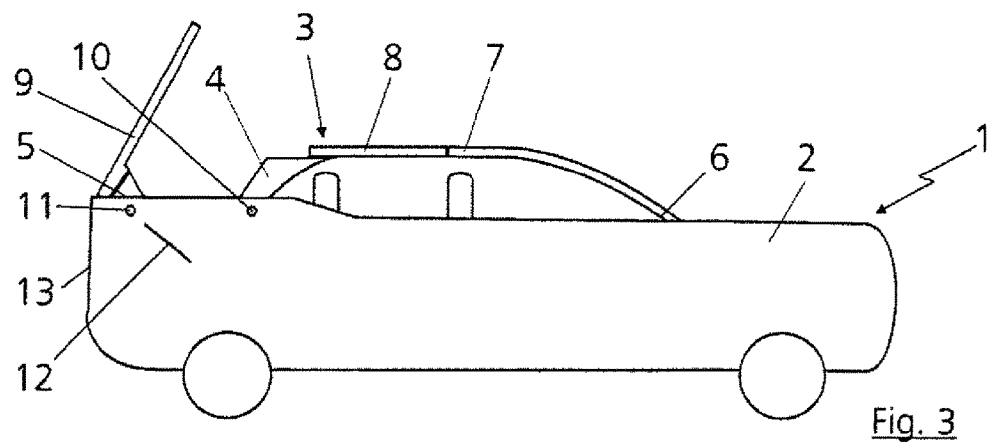
FIG. 3 the motor vehicle from FIG. 1 with the roof in a second intermediate position.

In the position of FIG. 3, the rear pillars 5, together with the rear roof part 9, have reached their most rearwardly pivoted position after undergoing a rotation about the center of rotation 11 and a movement along the guide 12.

Figure 4:
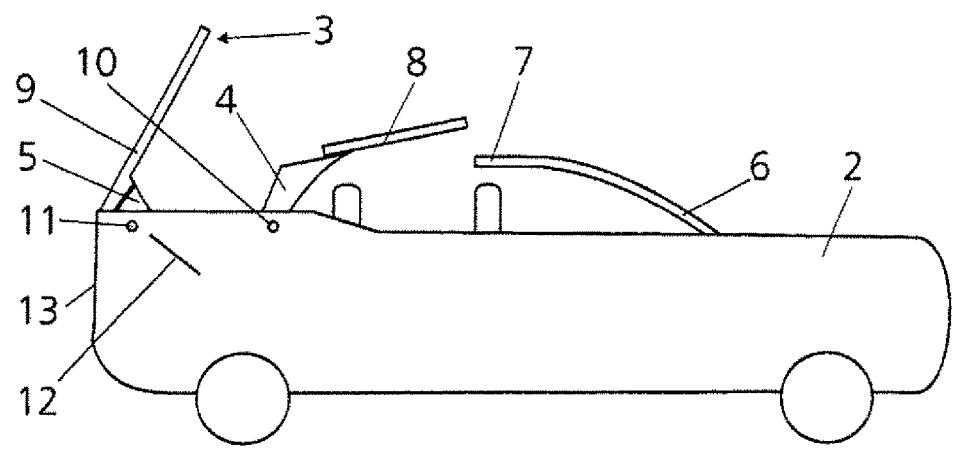
FIG. 4 the motor vehicle from FIG. 1 with the roof in a third intermediate position.

In the intermediate position of FIG. 4, the side pillars 4 have also been rotated about their center of rotation 10, so that the front roof part 8 has been detached from the windshield frame 7 and has also been raised. The rear pillars 5 and the rear roof part 9 remain in the same position as in FIG. 3.

Figure 5:
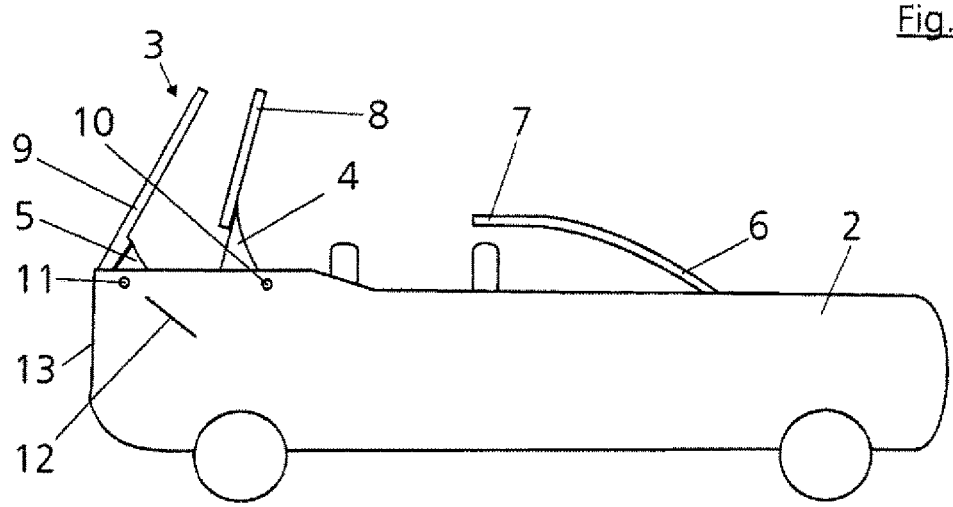
FIG. 5 the motor vehicle from FIG. 1 with the roof in a fourth intermediate position.

In the position shown in FIG. 5, the side pillars 4 and the front roof part 8 attached thereto have reached their uppermost position as the two side pillars 4 have been further rotated about the center of rotation 10. Provision may, optionally, also be made for a linear guide for the side pillars 4, similar to the guide 12 for the rear pillars 5.

FIG. 6 shows the front roof part 8 following a movement downwards into the body 2 of the motor vehicle 1. In this case, for example, the side pillars 4 can be rotated first to then remain rigid when the front roof part 8 is pivoted relative to the side pillars 4. Of course, simultaneous movement of the side pillars 4 relative to the body 2 and of the front roof part 8 relative to the side pillars 4 is also possible. In this state, the side pillars 4 may already have assumed their lowermost stowed position in the body 2.

FIG. 7 shows the closed position of the front roof part 8, which in this case has assumed its lowermost position in the body 2 as it has been further rotated in relation to the side pillars 4. Of course, the front roof part 8 can also be placed in this position far enough downwards as to be located fully within the body 2.

FIG. 8 shows the fully opened position of the roof 3, in which the rear roof part 9 is folded or turned relative to the front roof part 8 in the same way as the front roof part 8 and thus brought to the horizontal position. In this opened position of the roof 3, the rear roof part 9 forms a folding top compartment lid, below which the front roof part 8, the two side pillars 4, and the two rear pillars 5 are stowed.

As is apparent from the opened position of FIG. 8, the windshield frame 7 is arranged in such a position and the A pillars 6 have such a length that the windshield frame 7 forms in the opened position of the roof 3, together with the rear roof part 9 a rollover protection for persons located in the motor vehicle.

FIGS. 1 to 8 show the opening of the roof 3. The closing of the roof 3, i.e. the transfer thereof from the opened position according to FIG. 8 to the closed position according to FIG. 1, can be implemented in reverse manner to that described above.

In principle, both the opening and the closing of the roof 3 can also be executed in a sequence other than that shown or described, if this appears to be appropriate or necessary for certain reasons.

Figure 9:
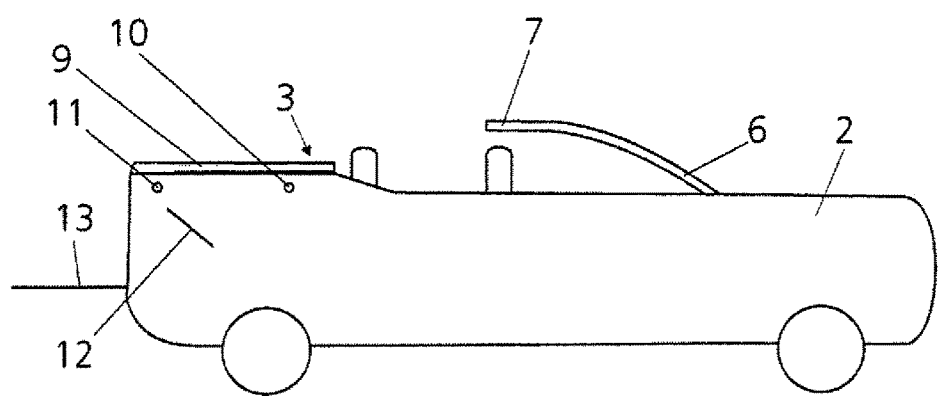
FIG. 9 the motor vehicle from FIG. 1 with an open tailgate.

In FIG. 9, a tailgate or trunk lid 13, which is normally located in the rear region of the motor vehicle 1, is shown in an opened position. In the present case, the tailgate 13 is rotatably connected to the body 2 at a lower edge thereof. As a result, the tailgate 13 can be moved to the horizontal position shown in FIG. 9 from the vertical position shown in FIGS. 1 to 8. In a manner not shown, the body 2 can have an opening for allowing the tailgate 13 to pivot or move inwards from its horizontal position. As a result, a person may approach completely to the edge of the body 2 for loading the trunk of the motor vehicle 1. Furthermore, the tailgate 13 can, in a manner not shown, have a rear window which can move in and move out of the same, so that the space between the rear pillars 5 can be closed in the closed state of the roof 3 according to FIG. 1.

In order to operate the two side pillars 4 and the two rear pillars 5, electric motors and/or hydraulic or pneumatic cylinders can be used. Furthermore, it is possible to use suitable linkages in order to connect the front roof part 8 with the two side pillars 4 and the rear roof part 9 with the two rear pillars 5. Such linkages can basically also be used for operating or guiding the side pillars 4 and/or the rear pillars 5 relative to the body 2. For connecting the roof parts 8 and 9 with the side and rear pillars 4 and 5, respectively, provision may be made for locks, which are also not shown in the figures.

In a manner not shown, the two side pillars 4 can be connected to one another in the transverse direction of the body 2, i.e. in a direction perpendicular to the drawing plane. Such a connection is conceivable, in particular, in the upper region of the side pillars 4, since not only a greater stiffness but also an improved bearing surface for the rear roof part 9 is achieved.

What is claimed is:

1. A motor vehicle, comprising:
a body;
two side pillars arranged on opposite sides of the body and movably connected to the body;
two rear pillars arranged on opposite sides of the body and movably connected to the body, and
a roof adjustable between a closed position and an opened position, said roof including a front roof part which is connected rotatably to the two side pillars, and a rear roof part which is connected rotatably to the two rear pillars, said rear roof part forming in the opened position of the roof a folding top compartment lid, below which the front roof part, the two side pillars, and the two rear pillars are stowed.

2. The motor vehicle of claim 1, wherein the two side pillars are rotatably mounted on the body at respective centers of rotation.

3. The motor vehicle of claim 1, wherein the two rear pillars are supported for rotation relative to the body, and further comprising guides configured to guide a displacement of the two rear pillars relative to the body.

4. The motor vehicle of claim 1, wherein the two side pillars are connected to one another in a transverse direction of the body.

5. The motor vehicle of claim 1, further comprising A-pillars, and a windshield frame connected to the A-pillars and arranged such as to form in the opened position of the roof together with the rear roof part a roll-over protection for a person in the motor vehicle.

6. The motor vehicle of claim 1, wherein the rear roof part rests on the two side pillars in the closed position of the roof.

7. The motor vehicle of claim 1, wherein the two side pillars and the two rear pillars are driveable by at least one electric motor and/or by at least one hydraulic or pneumatic cylinder.

8. The motor vehicle of claim 1, further comprising a tailgate having a lower edge which is rotatably connected to the body.

9. The motor vehicle of claim 8, wherein the tailgate is configured for pivoting into an opening of the body.

10. The motor vehicle of claim 8, wherein the tailgate has a rear window configured for movement in and out of the tailgate.

* * * * *